United States Patent [19]

Hashem

[11] Patent Number: 4,524,002

[45] Date of Patent: Jun. 18, 1985

[54] FOAMING AGENT

[75] Inventor: Mohamed M. Hashem, Wayne, N.J.

[73] Assignee: GAF Corporation, Wayne, N.J.

[21] Appl. No.: 469,069

[22] Filed: Feb. 23, 1983

[51] Int. Cl.$^3$ .............................................. C09K 7/08
[52] U.S. Cl. .................................. 252/8.5 C; 175/71; 252/8.55 B; 252/307
[58] Field of Search .......... 252/8.5 C, 8.55 B, 8.55 D, 252/551, 307

[56] References Cited

U.S. PATENT DOCUMENTS

| | | | |
|---|---|---|---|
| 2,766,212 | 10/1956 | Grifo | 252/551 X |
| 3,215,200 | 11/1965 | Kirkpatrick et al. | 252/8.55 X |
| 3,229,777 | 1/1966 | Rogers | 252/8.5 X |
| 3,391,750 | 7/1968 | Zika | 252/8.5 |
| 3,468,560 | 12/1969 | Hutchison et al. | 252/8.5 |
| 3,565,939 | 2/1971 | Beiser | 252/551 |
| 3,811,507 | 5/1974 | Flournoy et al. | 252/8.55 X |
| 4,075,129 | 2/1978 | Murata et al. | 252/551 |

Primary Examiner—Herbert B. Guynn
Attorney, Agent, or Firm—Marilyn J. Maue; Joshua J. Ward

[57] ABSTRACT

This invention relates to an oil drilling foaming agent comprising a mixture of from about 40% to about 60% by weight of a branched chain hexyl poly(oxyalkanediyl) sulfuric acid or sulfuric salt combined with from about 60% to about 40% by weight of a branched chain octyl- and/or branched chain decyl- poly(oxyalkanediyl) sulfuric acid or sulfuric salt, wherein the number average molecular weight of each of the components in the mixture is between about 180 and about 600. The above composition, in the presence of moisture, provides a superior foaming agent which is particularly useful in geothermal and air drilling operations. The high stability and foaming power of this composition over a wide range of electrolyte and/or electrolyte-diesel fuel concentrations also recommends its use in foam marker formulations, as a component in wall board manufacture and in other energy related applications.

9 Claims, 2 Drawing Figures

FOAMING AGENT

In one aspect, this invention relates to a composition having excellent foamability and stability in a high electrolyte atmosphere which may contain diesel fuel mixtures. In a more particular aspect the invention relates to a composition particularly adapted for use in geothermal or air drilling operations and especially in drilling operations involving underground high salt seepage and/or solutions mixed with crude oil.

BACKGROUND OF THE INVENTION

In the drilling of a bore into the earth with a rotary tool, it has been the almost universal practice up until recent years to circulate a liquid, such as water, oil, a water-in-oil emulsion, or an oil-in-water emulsion, usually with mud soilds suspended therein, to and from the drilling zone during the drilling operation. One of the functions in circulating these drilling fluids, usually in the form of a drilling mud, is to remove drilled solids from the bit and lift cuttings from the bore. As can be readily understood the drilling liquid must be circulated under high pressure to assure entrainment of cuttings and expulsion of mud from the bore hole.

In recent years, some wells have been successfully drilled at a reduced pressure by a different technique in which a compressed gas, such as air, is pumped into the well at the drilling site. This compressed gas flows rapidly up the well bore around the drill collar carrying with it the drilled solids and thus removing them from the drill hole. While in some instances, the drilling operation is essentially a dry process, in many formations, water high in electrolyte concentration, enters the bore hole from adjacent water-containing strata. Such water invasion most often occurs while drilling in or through a water bearing subterranean zone, but may also be encountered in any area in the vicinity of trapped underground water.

Some of the advantages of the gas drilling method over the more conventional mud drilling method include increased penetration rate, longer bit life, accurate location of water-bearing zones and measurement of flow, precise location of oil and gas bearing zones, especially those of low formation pressure, flow and pressure testing of productive zones without resort to drill stem tests, a lessening of possible contamination of prospective or known producing zones, and greater flexibility in physical-chemical alteration of the drilling fluid to meet particular down hole conditions. However, one difficulty in mist or dry gas drilling where water seeps into the bore and accumulates in the drilling zone, is that the drilled solids tend to agglomerate as the drill rotates. These agglomerated masses become too heavy to be lifted out by the gas so that antiballing agents, and foaming agents must be introduced into the bore to prevent this condition.

In recent years, the technology of air and mud drilling has been combined in an attempt to provide drilling foams which have greater lifting strength than air but which do not have the pressure limitations of drilling muds.

The rheological properties of aqueous foams are of great importance for a number of applications in petroleum production. These properties include high flow rates in tubes or pipes and in porous media such as oil-bearing sandstones. Aqueous foam has advantages in oil fields that contain viscous oil in low pressure reservoirs. In these operations, the foam raises to the surface not only sand pulverized by the bit but also pebbles and rocks of considerable size.

The requirements for utilization of an aqueous foam in subterranean formations include high stability with waters containing appreciable quantities of soluble salts, such as sodium chloride, calcium salts and/or magnesium salts and capability for handling a variety of foam breaking elements such as crude oil and solids. Further the foam must not degrade under extremes of physical environments.

Numerous foam compositions have been proposed and used, however most have proven unsatisfactory in one respect or another. Among the various classes of foaming compositions, are nonionics; however, these are affected by salts and high temperatures encountered in drilling. Although many anionic surfactants provide acceptable foams in soft waters, they form foam breaking precipitates in the presence of brine and/or hard water. Cationics are useless foamers because of their intolerance to high salinity. Although, amphoterics are medium foamers, they lack stability over periods required for removal of debris, usually above 3 minutes based on the pressure under which the foamer is introduced and the depth of the bore hole.

Accordingly, it is an object of this invention to overcome the deficiencies of air drilling and aqueous foam drilling fluids discussed above.

It is another object of this invention to provide an economical and commercially acceptable composition as a foaming agent in air or geothermal drilling operations.

Still another object of this invention is to provide a surfactant composition having excellent foaming power and high tolerance for aqueous solutions containing electrolytes and/or diesel oil.

Still another object is to provide a strong stable foam for use in wallboard manufacture, gypsum products or other uses which require a rigid foam.

THE INVENTION

Figure 1:
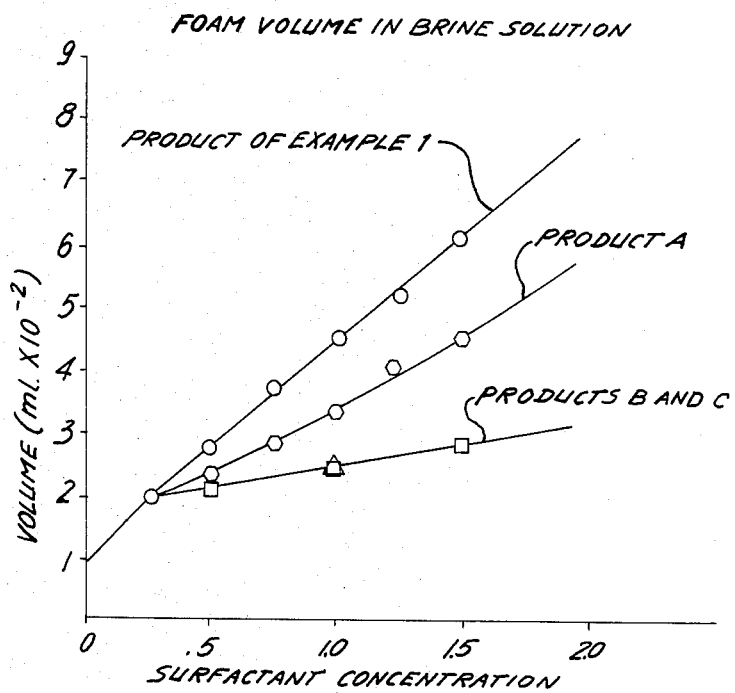
FIG. 1 compares the foam volume of a mixture according to the present invention with that of certain commercial products in a NaCl—CaCl$_2$ brine.

This invention relates to high foaming, electrolyte resistant composition comprising as the active ingredient a critical mixture of aliphatic ether sulfuric acids or salts thereof. More specifically this composition comprises a sulfuric acid or sulfuric salt mixture of from about 40 to about 60 weight % of a branched chain hexyl 20–50 weight % alkoxylated component and from about 60 to about 40 weight % of a branched chain octyl- and/or branched chain decyl- 20–50 weight % ethoxylated component. Preferably, the mole ratio of these sulfuric acid and/or salt components, within the mixture varies between about 1.3:1 and about 1:1.3. Accordingly, the surfactant mixtures of the present invention are those having the basic structure:

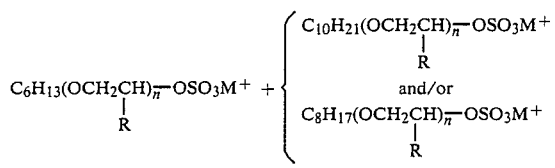

wherein n in each instance has an average value of 1 to 5, preferably 2 or 3; $M^+$ is a cation of the group $H^+$, $Na^+$, $K^+$, $NH_4^+$ or an amino radical containing a lower alkyl group, preferably methyl or ethyl, R is H or methyl, and each of the $C_6H_{13}$-, $C_8H_{17}$- and $C_{10}H_{21}$-alkyl groups have a branched structure.

The compounds of the present surfactant mixture can be conveniently prepared from commercially available "OXO-alcohols" of the $C_6$, $C_8$ and $C_{10}$ type, supplied by Exxon Corporation. The alcohols are intimately admixed in about stoichiometric amounts and reacted with a suitable alkylene oxide, e.g. ethylene oxide or propylene oxide. The reaction takes place at a temperature of between about 100° C. and about 150° C., under from about 10 to about 50 psig, in the presence of a base such as for example the hydroxide of ammonium, sodium or potassium or an alkoxide such as sodium methoxide, sodium ethoxide or sodium metal. The polyoxyethylated branched chain alkanol product is then sulfated with a convenient sulfating agent such as, for example, sulfamic acid, sulfaminic acid, sulfuric acid, chlorosulfonic acid or sulfur trioxide, at a temperature of between about 80° C. and about 150° C. for a period of from about 1 to about 5 hours, or until about 90% or more of the terminal hydroxy groups are sulfated. Sulfamic acid sulfaminic acids are the preferred sulfating agent since they provide sulfate groups in the ammonium or amino salt form, as contrasted to other sulfating agents, such as chlorosulfonic acid, sulfuric acid or sulfur trioxide, which provide sulfate groups in the acid form. When formed, the acid sulfate groups are preferably neutralized with an alkali metal base, an amine or ammonium hydroxide to provide the corresponding amine, sodium, potassium or ammonium salt as shown in the above formulae. The above reactions are graphically depicted by the following equations.

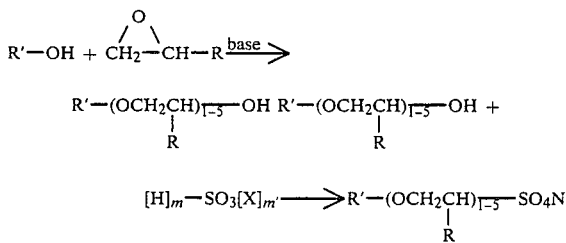

wherein X is $NH_2$, $NHR''$, $N(R'')(R''')$, Cl or OH; $R''$ and $R'''$ are independently lower alkyl; m and m' have the same value and are 0 or 1; R' is branched chain hexyl, octyl or decyl; R is hydrogen or methyl and N is hydrogen, ammonium or an amino radical preferably containing at least one lower alkyl group, eg. a methyl or ethyl group. When the sodium, potassium, ammonium or amino salt of the sulfuric derivative is desired, the sulfuric product may be neutralized with the corresponding base such as NaOH, KOH, $NH_4OH$, or the desired amine.

The products of the above polyoxyethylation and sulfation reactions can be formed simultaneously in the same reactor or can be separately prepared and thereafter blended to form a mixture within the ranges set forth above. The blend is then mixed with water or an aqueous alcohol solution to provide the concentrate liquid product which is introduced into an oil well as the present improved high foaming surfactant. The concentration of the foaming agent in the aqueous concentrate solution is maintained between about 0.05 and about 25% by weight; preferably between about 0.5 and about 15% by weight. When a drilling mud or aqueous drilling fluid is employed and concentration of the foaming agent therein is between about 0.2 and about 25 weight % of the composition. The present blend can also be employed in air drilling operations by introducing the aqueous concentrate directly into the vicinity of the drill bit in the well. It will be appreciated that air drilling operations require a substantially smaller volume of drilling fluid than that needed in a drilling mud where the aqueous concentrate containing the present blend forms only part of the aqueous formulation. Preferably, the concentration of the concentrate in a drilling mud varies between about 0.5 wt. % and about 20 wt. % of the formulation which may also contain the conventional dispersants, buffering agents, viscosity modifiers, solvents, emulsifiers and foam boosters, as required or desired.

The formulation is generally pumped at a rate of between about 10 and 70 gallons/minute, preferably between about 20 and about 50 gallons/minute, to the vicinity of the drill bit under a pressure of from about 120 to about 3,000 psig., preferably from about 150 to about 2,000 psig. Beneficially, from about 10,000 to about 70,000 lbs. of foaming agent is used per well of average depth. It is to be understood that higher or lower rates and amounts can be employed to meet the needs of a specialized operation.

Drilling operations wherein diesel oil contaminating the drilling fluid reaches a concentration above about 5%, require a higher concentration of the present mixture, e.g. up to about 10% by weight in an aqueous solution introduced into the bore or 10% by weight of oil as in air drilling. The presence of brine is not as troublesome a defoamer; still, where brine concentrations above 25% are encountered, it is best to employ the more concentrated foamer drilling solution mixture in the fluid introduced into the well. Generally, the concentrations of brine and diesel oil encountered in most drilling operations falls within the ranges of between about 0.1 and about 20% and between about 0.1 and about 5% respectively.

In oil well explorations using aqueous foams, a bore is drilled at a chosen site and the foamable fluid is piped into the bore under pressure for emission at or near the drill bit where it continuously cleans debris from the bit and carries solids upwardly in the bore hole to ground level where it is allowed to drain off or is pumped away. To maintain the continuous cleaning and flushing operation, the fluid is generally introduced under a pressure of between about 130 psig and about 1,500 psig for bore depths of between 1,000 and 5,000 feet. The foam should remain stable at these pressures for the time required to flush away solids, i.e. usually above 3 minutes. The particular composition of this invention exhibits the unusually high stability required for these operations, namely a total foam life of more than 5 minutes.

The above referenced "OXO-alcohols" which were used to illustrate the formation of the hydrophobe of the respective surfactant components are commercially available as isomeric mixtures; therefore; from the standpoint of economics and availability, these mixtures are preferred for synthesizing the present surfactant blends. Specifically, the iso-$C_{10}$ "OXO-alcohol" is primarily a mixture of randomly branched trimethyl-1-heptanols. The iso-$C_6$ "OXO-alcohol" is supplied as a more complex mixture, generally composed of the following ingredients in about the following weight % range.

| Alcohol | Wt. % |
| --- | --- |
| 1-Hexanol | 30–40% |
| 2-Methyl-1-Pentanol | 10–20% |
| 3-Methyl-1-Pentanol | 20–25% |
| 4-Methyl-1-Pentanol | 10–20% |
| Other C-6 Alcohols | 1–2% |
| C-7 Alcohols (Branched) | 2–8% |
| Light Alcohol (%-5) and Hydrocarbons | 1–2% |

However, it is to be understood that individual $C_6$, $C_8$ and/or $C_{10}$, branched chain alkanols can be employed in a pure state or in a different mixture of isomers for use in the present ethoxylation reaction and the resulting ethoxylated branched hexanol, octanol and decanol products sulfated as set forth above to provide the stable surfactant blend of the invention. Examples of individual branched alkanol compounds suitably employed individually or in admixture in forming the blends of the present invention include the methyl pentanol isomers, dimethyl butanol isomers, ethyl butanol isomers, methyl heptanol isomers, dimethyl hexanol isomers, ethyl hexanol isomers, methyl nonanol isomers, dimethyl octanol isomers, trimethyl heptanol isomers, ethyl methyl heptanol isomers, and others, preferably those having at least 5 carbon atoms in the main chain.

The anionic surfactants herein described produce stable foams in hard, soft or fresh water and the preferred 45-55/55-45 mole ratio blends of the branched hexyl and branched decyl and/or branched octyl moieties that constitute the hydrophobic portion of the surfactant molecules are additionally found to exhibit maximum foam stability in brine and crude oil mixtures. The remarkable foam stability of the present surfactant mixture is clearly established by the following examples, which are set forth to illustrate preferred embodiments of the invention but which are not to be construed as limiting the scope thereof as more generally defined above and in the appended claims. All amounts and proportions in the following example are by weight unless otherwise indicated.

EXAMPLE 1

Preparation of 50/50 blend of Isohexyl/Isodecyl Ethoxylates

In a one gallon stainless steel autoclave, 250 g of OXO-decyl alcohol and 250 g of OXO-hexyl alcohol were combined such that the blend represents 3.84 moles of an average molecular weight of 130. To this blend, 1 g of solid sodium hydroxide catalyst was added and stirred. The autoclave was purged with nitrogen three times and heated under 22 inches of vacuum. The vacuum was released by adding a total of 508 g of ethylene oxide from a separate pressure cylinder. The temperature of the reaction was kept between 110°–130° C. and the vacuum between 15–30 psig. When all ethylene oxide was added the pressure inside the autoclave dropped to 0 psig indicating completion of the reaction. The resulting ethoxylate was neutralized with 2 g acetic acid and filtered. The hydroxyl value of this product was 218 mg KOH/g sample calculating for an average molecular weight of 257 (theory MW=262). Based on OH number, the yield of three-mole ethoxylate blend having the formula 50%* $C_6H_{13}(CH_2CH_2O)_3H$/ 50%* $C_{10}H_{21}(CH_2CH_2O)_3H$ was 98%.

*$C_6$ and $C_{10}$ alkyl groups have branched chain structure.

Preparation of a 50/50 Blend of Isohexyl-/Isodecyl-Poly(Oxyethanediyl)-Sulfo Ammonium Salt Exactly 128.5 g (0.5 mole) of the foregoing ethoxylate blend was reacted with 53.3 g (0.55 mole) of sulfamic acid under $N_2$ atmosphere for 3 hours at 120°–125° C. The standard apparatus used consisted of 3-necked flask, a stirrer, a thermometer and a $N_2$ source. The product obtained was analyzed for activity and showed 90% yield by methylene blue two-phase titration method. This ammonium sulfated ethoxylate was neutralized with 10 g of monoethanolamine and diluted with 10–15% (based on total final weight) ethanol or isopropanol and 25–30% of water (based on total final weight) to provide an aqueous alcohol solution of a 50/50% blend of the corresponding product, i.e.

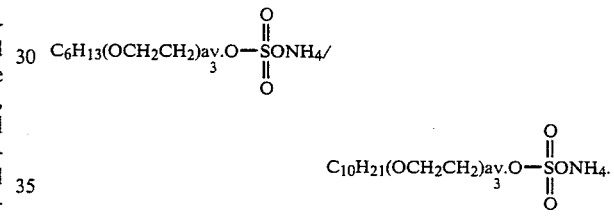

EXAMPLE 2

Preparation of 50/50 blend of 2-methyl-pentyl-tri(oxyethanediyl)-sulfo sodium salt and 2,3,5-trimethyl-heptyltri(oxyethanediyl)-sulfo potassium salt A series of three flasks are connected to each other.

The first is a $SO_3$ evaporator which consists of a 500 ml three-necked flask with glass connections for a nitrogen inlet, thermometer, and exit tube for the $SO_3/N_2$ mixture. This flask is then connected to an empty safety flask and this in turn is connected to a 500 ml three-necked reaction flask equipped with glass mechanical stirrer and outlet tube for exiting nitrogen.

To the evaporator is added 49 g (0.55 mole) of stabilized sulfur trioxide and to the reaction flask is added 117 g (0.5 mole) of 2-methyl-5-pentanol triethoxylate

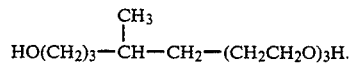

The evaporator is warmed and stirred vigorously to vaporize $SO_3$ which vapor enters the reactor. The temperature of the reaction is kept at 25° C. but no higher than 30°–35° C. The reacting mixture becomes dark brown during the first 0.5 hr. and the reaction is complete after 2.5 hrs. The resulting product, with 200 ml of 10% sodium hydroxide (0.5 mole), is poured over crushed ice. A thick brown paste forms which is then agitated with 2 liters of cold methanol to form a homogeneous liquid and to precipitate the product which is separated by filtration. After drying, 125 gm (74%) of product having the

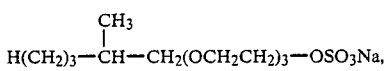

was recovered. By analysis the product contains less than 2% sodium sulfate.

The same reaction was repeated, except, KOH is substituted for NaOH and 2,3,5-trimethyl-7-heptanol triethoxylate

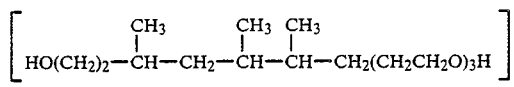

is substituted for 2-methyl-5-pentanol triethoxylate. Accordingly, the product is 2,3,5-trimethyl-7-heptyl-tri (oxyethanediyl)-sulfo potassium salt

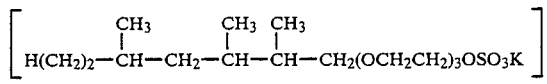

which is obtained in 81% yield.

A 50/50% blend of the above sodium and potassium salt products was prepared by mixing in these proportions. This blend was designated as product D.

EXAMPLE 3

Preparation of 50/50 blend of Isohexyl-/Isooctyl-ethoxylate

A blend of an average molecular weight of 116 comprised of OXO-hexyl alcohol (250 g) and OXO-octyl alcohol (250 g) was placed in a stainless steel one gallon autoclave and 1 g solid KOH was added. The autoclave was then purged with $N_2$ and heated under 22 inches of vacuum. The vacuum was released by adding a total of 568 g of ethylene oxide. The temperature of the reaction was maintained between 110°–130° C. and the vacuum between 15–30 psig. The resulting ethoxylated product was neutralized with 1.5 g phosphoric acid and the filtered. The average molecular weight of this ethoxylate run by OH number was 246 (theoretical MW-248) indicating a 99% yield. The product blend has the formula 50% iso-hexyl($OCH_2CH_2$)$_3$—OH/50% iso-octyl-($OCH_2CH_2$)$_3$OH.

Preparation of a 50/50 blend of Isohexyl-/Isooctyl-Poly(Oxyethanediyl)-Sulfo Ammonium Salt Sulfamic acid (107 g, 1.1 mole) was reacted with 246 g (1 mole) of the ethoxylate mixture of this example under $N_2$ atmosphere in a similar manner as set forth in Example 1. The activity of the resulting salt was 91% by analysis by methylene blue titration. The product was worked up in a similar manner as set forth in Example 1 and the product blend has the formula 50% iso-hexyl ($OCH_2CH_2$)$_3$—$OSO_3NH_4$/50% iso-octyl-($OCH_2CH_2$)$_3$—$OSO_3NH_4$.

EXAMPLE 4

Preparation of 55/25/20 blend of iso-$C_6$/iso-$C_8$/iso-$C_{10}$ Poly(Oxyethanediyl) Sulfo Ammonium Salts The procedure described in Example 1 was repeated for each of the following reactant mixtures: 1 mole isohexyl alcohol + 2 moles of ethylene oxide; 1 mole of iso-octyl alchol + 3 moles of ethylene oxide and 1 mole of iso-decyl alcohol + 5 moles of ethylene oxide. The products of these reactions are iso-$C_6H_{13}$—($OCH_2CH_2$)$_2$—OH (Product 1); iso-$C_8H_{17}$—($OCH_2CH_2$)$_3$OH (Product 2) and iso-$C_{10}H_{21}$—($OCH_2CH_2$)$_5$—OH (Product 3).

Each of these products were independently sulfated with sulfamic acid at 125° C. for 4 hours as follows.

TABLE I

| | Amt. of Polyoxyethylated Isoalkanol g/MW | Moles Sulfamic Acid g/Moles | MW of Sulfated Product |
|---|---|---|---|
| Product 1 | 200/190 | 112.4/1.158 | 287 |
| Product 2 | 300/262 | 122.2/1.260 | 359 |
| Product 3 | 400/378 | 112.9/1.164 | 476 |

The sulfated products of products 1, 2 and 3 were then blended as 55% of sulfated product 1; 25% of sulfated product 2 and 20% of sulfated product 3 having the formula 55% iso-$C_6H_{13}$—($OCH_2CH_2$)$_2$—$OSO_3NH_4$ + 25% iso-$C_8H_{17}$—($OCH_2CH_2$)$_3$—$OSO_3NH_4$ + 20% iso-$C_{10}H_{21}$—($OCH_2CH_2$)$_5OSO_3NH_4$. This blend was designated as product E.

EXAMPLES 5–31

The Waring Blender foam test, was used in the following examples. This test rates products according to foam volume and foam stability as measured under static conditions. Foam stability reported by this method is defined as the time (min/sec) required for one half of the liquid volume to drain from the foam. Briefly the test in Examples 5–31 involves agitating 100 ml of brine solution (10% NaCl + 2% $CaCl_2$ in 86% tap water) containing 1.0 diesel fuel and 1.0 g surfactant under test. The blender is run at 23,000 rpm* for one minute after which the foam volume is measured in the graduated blender. At the end of the agitation cycle the time continues to run until 50 ml of water has drained from the foam. This is called half-life of the foam and represents the foam stability of the surfactant under test. The total time from the starting of agitation to the separation of 50 ml of liquid is indicated as foam stability. The time for defoaming of the entire sample is substantially longer than twice the half life.

*Simulates the foam formed at the drill bit site.

The product of Example 1, i.e. the mixture of 50 parts iso-$C_6H_{13}(OC_2H_4)_3OSO_3NH_4$ and 50 parts iso-$C_{10}H_{21}(OC_2H_4)_3$—$OSO_3NH_4$, was compared with the commercial product Alipal CD-128 (supplied by GAF Corporation) which is a 45/55 mixture of n-$C_8H_{17}(OC_2H_4)_3OSO_3NH_4$ and n-$C_{10}H_{21}(OC_2H_4)_3OSO_3NH_4$. Alipal CD-128 is designated as Product C in the following Tables.

The product of Example 1 was also compared with two competitive products, namely Product A, i.e. Air Foam-B, which is a 50/50 blend of n-$C_8H_{17}(OCH_2CH_2)_{3.5}$—$OSO_3NH_4$/n-$C_{10}H_{21}(OCH_2CH_2)_{3.5}$—$OSO_3NH_4$ supplied by Stepan Chemicals Co. and Product B, namely AP-50, which is a 50/50 blend of n-$C_{10}H_{21}$(OCH$_2$CH$_2$)—OSO$_3$NH$_4$/n-$C_{12}H_{23}$(OCH$_2$CH$_2$)OSO$_3$NH$_4$ also supplied by Stepan Chemicals Co.

The data in Table II shows that the product of Example 1 produces at least 37% higher foam volume than any of competitive products A, B or C (52% higher than product B) at 1% surfactant concentration. More concentrated solutions of the present surfactant blend shown in Table II gave still higher and more stable foams than the competitive products.

The salts of the individual iso-$C_8$, iso-$C_6$ and iso-$C_{10}$ poly(oxyethanediyl) sulfuric acids were far inferior to the present blend in brine mixed with diesel oil as shown in Table II or brine alone as shown in Table IV. The corresponding salts of the n-hexyl poly(oxyethanediyl) sulfuric acid showed foam volume and stability below that of the individual iso-species.

The properties of the product of Examples 2 and 4 as compounds D and E are also reported in Table II and shown to be far superior to competitive products A, B and C.

TABLE II

| Ex. | Surfactant Tested | Foam Vol. ml. | Foam Stability $t_\frac{1}{2}$ min./sec. |
|---|---|---|---|
| 5 | Product of Example 1 | 475 | 2:55 |
| 6 | Product C | 240 | 1:20 |
| 7 | Product A | 300 | 1:45 |
| 8 | Product B | 230 | 1:30 |
| 9 | Product D | 420 | 2:41 |
| 10 | Product E | 420 | 2:45 |
| 11 | iso-$C_6H_{13}$(OCH$_2$CH$_2$)$_{\overline{3}}$—O—S(=O)(=O)—ONH$_4$ | 410 | 2:28 |
| 12 | iso-$C_8H_{17}$(OCH$_2$CH$_2$)$_{\overline{3}}$—O—S(=O)(=O)—ONH$_4$ | 345 | 2:02 |
| 13 | iso-$C_{10}H_{21}$(OCH$_2$CH$_2$)$_{\overline{3}}$—O—S(=O)(=O)—ONH$_4$ | 250 | 1:23 |

The above tests with the Waring Blender were repeated for a comparison of the present mixture with products A and B at different concentration levels as indicated in following Table III.

TABLE III

| Ex. | Product | % Surfactant | Foam Vol. ml. | Foam Stability $t_\frac{1}{2}$ min./sec. |
|---|---|---|---|---|
| 14 | Product of Ex. 1 | 0.50 | 275 | 1:25 |
| 15 | | 0.75 | 375 | 2:00 |
| 16 | | 1.25 | 525 | 3:25 |
| 17 | | 1.50 | 625 | 3:55 |
| 18 | Product A | 0.50 | 240 | 1:15 |
| 19 | | 0.75 | 280 | 1:30 |
| 20 | | 1.25 | 425 | 1:45 |
| 21 | | 1.50 | 450 | 2:35 |
| 22 | Product B | 0.50 | 200 | 1:05 |
| 23 | | 1.00 | 230 | 1:30 |
| 24 | | 1.50 | 275 | 1:35 |

Brine = 10% NaCl + 2% CaCl$_2$
Diesel Fuel No. 2, Flash point above 125° F.

The above tests with the Waring Blender (surfactant at 1% concentration) were repeated, except that the brine solution contained 87% water and no diesel fuel. The results of these tests are reported in following Table IV.

TABLE IV

| Ex. | | Foam Vol. ml. | Foam Stability min./sec. |
|---|---|---|---|
| 25 | Product of Example 1 | 650 | 5:23 |
| 26 | Product C | 500 | 4:17 |
| 27 | Product A | 550 | 4:56 |
| 28 | Product B | 400 | 3:21 |
| 29 | Iso-hexyl alc. + 3 sulfate, Amm. salt | 400 | 2:44 |
| 30 | Iso-octyl alc. + 3 EO sulfate, Amm. salt | 600 | 4:53 |
| 31 | Iso-decyl alc. + 3 EO sulfate, Amm. salt | 450 | 3:10 |

When Examples 5, 14–17 and 25 are repeated with the corresponding sodium and potassium salts of the above poly(oxyethanediyl)-sulfo iso-$C_6$ and iso-$C_{10}$ alkyloxy mixture, and with the sulfonic acid derivative, substantially the same foams of high stability are obtained.

EXAMPLES 32 and 33

When the $C_8$ iso-alkoxy component replaces the $C_6$ iso-alkoxy component in Example 1 above to provide a mixture of iso-$C_8H_{17}$—(OCH$_2$CH$_2$)$_3$—SO$_4$NH$_4$/iso-$C_{10}H_{21}$(OCH$_2$CH$_2$)$_3$—SO$_4$NH$_4$ the foam stability and foam volume fall off markedly. The results of this substitution are shown in Table V. The foam stability and foam volume of the product of Example 3 are also reported in Table V and show a marked improvement over the above blend.

For the tests reported in Table IV, the concentration of surfactant blend was 1%; diesel fuel No. 2 was 1% and brine (10% NaCl + 2% CaCl$_2$) was 12% in 86% water.

TABLE V

| Ex. | Surfactant Blend | Foam Vol. ml. | Foam Stability $t_\frac{1}{2}$ min./sec. |
|---|---|---|---|
| 32 | iso-$C_8$/iso-$C_{10}$ (50/50) blend + 3 EO | 350 | 2:02 |
| 33 | iso-$C_6$/iso-$C_8$ (50/50) blend + 3 EO | 500 | 3:30 |

Ammonium salt blends suitable as drilling fluids with good foam stability and foam volume were prepared by blending the following individual components prepared by the procedure outlined in Example 1.

| | Parts |
|---|---|
| Blend 1 | |
| 2-methyl-pentyl tri(oxyethanediyl) sulfo ammonium salt | 35 |
| 2,4-dimethyl-butyl di(oxyethanediyl) sulfo ammonium salt | 10 |
| 2-ethyl-pentyl tetra(oxyethanediyl) sulfo ammonium salt | 10 |
| 2,3,5-trimethyl-heptyl tri(oxyethanediyl) sulfo ammonium salt | 25 |
| 2-methyl-5-ethyl-heptyl tetra(oxyethanediyl) sulfo ammonium salt | 15 |
| 2,3-dimethyl-octyl di(oxyethanediyl)sulfo ammonium salt | 5 |
| Blend 2 | |
| 2,3-dimethyl butyl di(oxyethanediyl) sulfo ammonium salt | 5 |
| 4-methylpentyl tetra(oxyethanediyl) sulfo | 12 |

| | Parts |
|---|---|
| ammonium salt | |
| 2,3-dimethyl butyl tri(oxyethanediyl) sulfo ammonium salt | 10 |
| 2-methyl pentyl tri(oxyisopropanediyl) sulfo ammonium salt | 30 |
| 2-ethyl-3,3-dimethyl-hexyl tri(oxyisopropanediyl) sulfo ammonium salt | 5 |
| 2,3,5-trimethyl-heptyl di(oxyisopropanediyl) sulfo ammonium salt | 8 |
| 2,4-dimethyloctyl tri(oxyisopropanediyl) sulfo ammonium salt | 30 |

The following mixtures are also examples of suitable foaming agents for drilling operations described herein.

| | Parts |
|---|---|
| Blend 3* | |
| 2-methyl-pentyl tri(oxyethanediyl) sulfo-N—methylamino salt | 35 |
| 4-methyl-pentyl tri(oxyethanediyl) sulfo-N,N—dimethylamino salt | 8 |
| 2,2,3-trimethylheptyl di(oxyethanediyl) sulfo-N—methylamino salt | 47 |
| 2,3,5-trimethylheptyl tri(oxyethanediyl) sulfo-N,N—dimethylamino salt | 10 |
| Blend 4** | |
| 2-methylpentyl tri(oxyethanediyl)sulfuric acid | 47 |
| 2-ethylbutyl tri(oxyethanediyl)sulfuric acid | 5 |
| 2,3,5-trimethylheptyl tri(oxyethanediyl) sulfuric acid | 40 |
| 2,3-dimethyloctyl di(oxyethanediyl)sulfuric acid | 8 |

*The alkylamino salts are prepared by substituting sulfur trioxide for sulfamic acid in Example 1 and then neutralizing the acid product with the corresponding alkyl amine.
**The sulfuric acid are prepared by substituting sulfur trioxide for sulfamic acid in Example 1.

It has been observed that with anionic air and gas drilling foaming agents there is a tendency of the anionic surfactant to emulsify the diesel oil, thus, reducing the effective concentration of the surfactant in the aqueous solution and causing defoamation. However, the presence of the particular isoalkyl moieties in the mixture of the present drilling blends functions as a de-emulsifier of diesel oil in the presence of brine and provides the extended foam stability required for a more efficient drilling blend.

Figure 2:
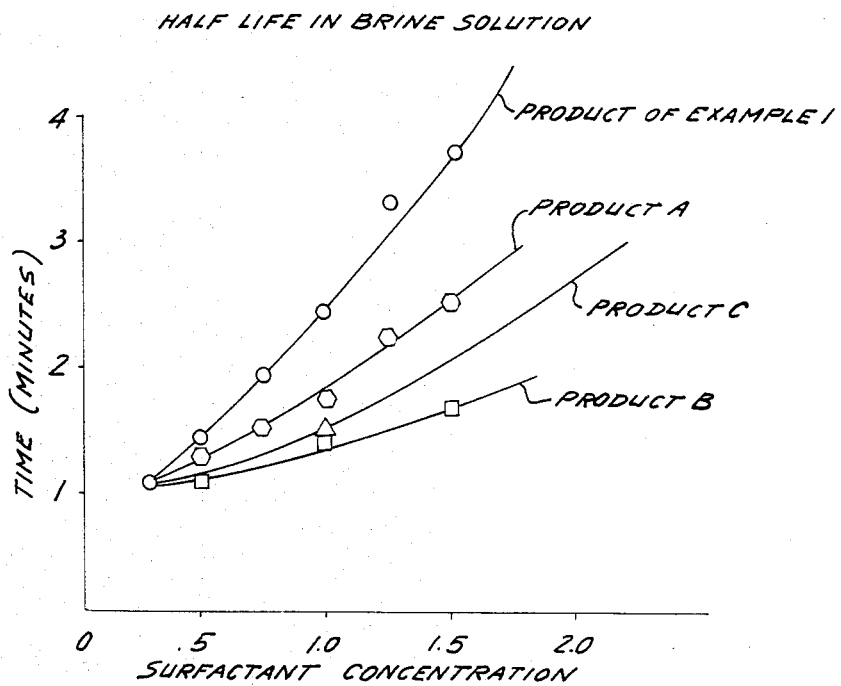
FIG. 2 compares the foam half life of the same in the same brine solution.

FIG. 1 compares the foam volume of the mixture of Example 1 with that of Products A, B and C at concentration levels between 2.5% and 20% in 10% $NaCl + 2\% \; CaCl_2$ brine. FIG. 2 compares the foam half life of the same at the same concentration levels in the same brine solution. These data illustrate the superiority of one of the preferred blends as a drilling fluid over competitive products.

What is claimed is:

1. A high foaming, electrolyte resistant composition consisting essentially of from about 40 to about 60 weight % of component A having the structure

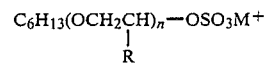

and from about 60 to about 40 weight % of component B having the structure

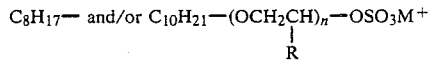

wherein n in each instance has an average value of 1–5; R is hydrogen or methyl; $M^+$ is $H^+$, $Na^+$, $K^+$, $NH_4^+$ or a lower alkylamino group and each of the $C_6H_{13}$-, $C_8H_{17}$- and $C_{10}H_{21}$- alkyl groups has a branched structure.

2. The composition of claim 1 wherein n in each instance has an average value of 2 or 3.

3. The composition of claim 1 wherein $M^+$ is ammonium and the $C_6H_{13}$- alkyl group is predominantly methylpentyl.

4. The composition of claim 1 wherein the $C_6H_{13}$- alkyl group is predominantly methylpentyl and each of the branched chain $C_8H_{17}$- and $C_{10}H_{21}$- alkyl groups has at least 5 carbon atoms in the main chain.

5. The process of introducing to the drilling zone of a well drilling operation in the presence of water an effective flushing amount of the foamable composition of claim 1.

6. The process of claim 5 wherein the composition is introduced in from about 0.05 to about 25 weight % concentration in aqueous solution.

7. The process of claim 6 wherein the composition is introduced under pressure to the vicinity of the drill bit in the well drilling operation.

8. The process of claim 7 wherein well water is contacted in the vicinity of the drilling zone and said well water contains between about 0.1 and about 20% brine and/or between about 0.1 and about 5% diesel oil.

9. The process of claim 5 wherein the well drilling operation is an air drilling operation employed for oil well drilling.

* * * * *